(12) United States Patent
Ohlsson et al.

(10) Patent No.: US 9,450,394 B2
(45) Date of Patent: Sep. 20, 2016

(54) METHOD, CIRCUIT BREAKER AND SWITCHING UNIT FOR SWITCHING OFF HIGH-VOLTAGE DC CURRENTS

(71) Applicant: ABB Technology AG, Zürich (CH)

(72) Inventors: Daniel Ohlsson, Wettingen (CH); Emmanouil Panousis, Baden (CH); Jürgen Häfner, Ludvika (SE); Markus Bujotzek, Zürich (CH); Per Skarby, Würenlos (CH)

(73) Assignee: ABB Technology AG, Zurich (CH)

( * ) Notice: Subject to any disclaimer, the term of this patent is extended or adjusted under 35 U.S.C. 154(b) by 603 days.

(21) Appl. No.: 13/925,533

(22) Filed: Jun. 24, 2013

(65) Prior Publication Data
US 2013/0278078 A1    Oct. 24, 2013

Related U.S. Application Data

(63) Continuation of application No. PCT/EP2011/072959, filed on Dec. 15, 2011.

(30) Foreign Application Priority Data

Dec. 23, 2010   (EP) .................... 10196908

(51) Int. Cl.
*H02H 3/00*        (2006.01)
*H02H 3/02*        (2006.01)
(Continued)

(52) U.S. Cl.
CPC .............. *H02H 3/02* (2013.01); *H01H 9/548* (2013.01); *H01H 33/125* (2013.01);
(Continued)

(58) Field of Classification Search
USPC .......................................... 361/2
See application file for complete search history.

(56) References Cited

U.S. PATENT DOCUMENTS

| 4,307,428 A |   | 12/1981 | Yanabu et al. |
|---|---|---|---|
| 4,541,033 A | * | 9/1985 | Saito .............. H01H 33/125 |
|   |   |   | 200/48 R |

(Continued)

FOREIGN PATENT DOCUMENTS

| CN | 1052393 A | 6/1991 |
|---|---|---|
| CN | 1617281 A | 5/2005 |

(Continued)

OTHER PUBLICATIONS

International Preliminary Report on Patentability (Forms PCT/IB/373) and the Written Opinion of the International Searching Authority (Form PCT/ISA/237) dated Dec. 15, 2011, issued in corresponding International Application No. PCT/EP2011/072959). (11 pgs.).

(Continued)

*Primary Examiner* — Ronald W Leja
(74) *Attorney, Agent, or Firm* — Taft Stettinius & Hollister LLP

(57) ABSTRACT

A high voltage DC circuit breaker includes a semiconductor switching assembly in series with a mechanical switch. When the semiconductor switching assembly is switched off due to a current fault, a residual current flowing through arresters of the semiconductor switching assembly is switched off by the mechanical switch. A capacitor arranged parallel to the mechanical switch leads to passive resonance effects, which in turn induce current zero crossings in its arc. The current zero crossings allow for reliable extinguishing of the arc. The mechanical switch can be an AC circuit breaker.

30 Claims, 2 Drawing Sheets

(51) Int. Cl.
  *H01H 9/54* (2006.01)
  *H01H 33/12* (2006.01)
  *H01H 33/59* (2006.01)
  *H02H 3/087* (2006.01)

(52) U.S. Cl.
  CPC .......... *H01H 33/596* (2013.01); *H02H 3/025* (2013.01); *H01H 2009/543* (2013.01); *H02H 3/087* (2013.01); *Y10T 307/747* (2015.04)

(56) References Cited

U.S. PATENT DOCUMENTS

| | | | |
|---|---|---|---|
| 4,560,848 A | 12/1985 | Arimoto | |
| 4,636,907 A * | 1/1987 | Howell | H01H 9/542 |
| | | | 307/137 |
| 5,121,281 A | 6/1992 | Pham et al. | |
| 5,999,388 A | 12/1999 | Asplund | |
| 6,437,273 B2 * | 8/2002 | Stechbarth | 218/154 |
| 7,508,636 B2 | 3/2009 | Sellier et al. | |
| 8,995,097 B2 | 3/2015 | Skarby | |
| 2005/0146814 A1 | 7/2005 | Sellier et al. | |
| 2010/0224594 A1 | 9/2010 | Uchii et al. | |
| 2011/0175460 A1 | 7/2011 | Åström et al. | |
| 2012/0032762 A1 | 2/2012 | Lescale | |
| 2012/0234796 A1 | 9/2012 | Juhlin | |
| 2013/0038975 A1 | 2/2013 | Häfner et al. | |
| 2013/0070492 A1 | 3/2013 | Skarby | |
| 2013/0278078 A1 * | 10/2013 | Ohlsson | H01H 9/548 |
| | | | 307/113 |

FOREIGN PATENT DOCUMENTS

| | | | |
|---|---|---|---|
| DE | 28 02 556 A1 | 7/1979 | |
| DE | 2802556 A1 | 7/1979 | |
| EP | 0 125 553 A2 | 11/1984 | |
| EP | 0 867 998 A1 | 9/1998 | |
| GB | 2 031 652 A | 4/1980 | |
| GB | 2493911 A * | 2/2013 | ............ H01H 9/548 |
| WO | 2009149749 A1 | 12/2009 | |
| WO | WO 2010/060476 A1 | 6/2010 | |
| WO | WO 2011/050832 A1 | 5/2011 | |
| WO | 2011141428 A1 | 11/2011 | |
| WO | WO 2011/141054 A1 | 11/2011 | |

OTHER PUBLICATIONS

International Search Report (PCT/ISA/210) issued on Mar. 26, 2012, by the European Patent Office as the International Searching Authority for International Application No. PCT/EP2011/072959.

Written Opinion (PCT/ISA/237) issued on Mar. 26, 2012, by the European Patent Office as the International Searching Authority for International Application No. PCT/EP2011/072959.

Search Report issued on Jan. 23, 2015, by the State Intellectual Property Office of People's Republic China in corresponding Chinese Patent Application No. 201180068384.5 (3 pgs).

English Translation of the Comments to Examiners Objection (First Office Action) Chinese Office Action dated Feb. 3, 2015 in corresponding Chinese Patent Application No. 201180068384.5 (4 pgs).

* cited by examiner

METHOD, CIRCUIT BREAKER AND SWITCHING UNIT FOR SWITCHING OFF HIGH-VOLTAGE DC CURRENTS

RELATED APPLICATIONS

This application claims priority as a continuation application under 35 U.S.C. §120 to PCT/EP2011/072959, which was filed as an International Application on Dec. 15, 2011 designating the U.S., and which claims priority to European Application 10196908.7 filed in Europe on Dec. 23, 2010. The entire contents of these applications are hereby incorporated by reference in their entireties.

FIELD

The present disclosure relates to a method and a circuit breaker for switching off high-voltage DC currents using semiconductor switches as well as mechanical switches. The present disclosure also relates to a switching unit for breaking a high-voltage DC current and to a method for switching off a high-voltage DC current by means of the switching unit.

BACKGROUND INFORMATION

Interruption of direct currents (DC) is one of the major challenges for the realization of multi-terminal DC networks (MTDC). Several approaches have been investigated. For such a system, speed is an important requirement, and very high speeds can be achieved using a semiconductor-based circuit breaker.

Semiconductor-based circuit breakers described, for example, in U.S. Pat. No. 5,999,388 and EP 0 867 998, generally include a semiconductor switching assembly having a plurality of semiconductor switches in series. A plurality of arresters is arranged in parallel to the semiconductor switches and is used to limit the voltage over each switch.

One drawback of this type of arrangement is the fact that, when the switches are switched off, a residual current continues to flow. This current primarily flows through the arresters and, to a smaller extent, through the semiconductor switches.

SUMMARY

An exemplary embodiment of the present disclosure provides a method for switching off a high-voltage DC current from a voltage source delivering a nominal voltage by means of a circuit breaker, which includes a semiconductor switching assembly and at least one mechanical switch in series. The semiconductor switching assembly includes a plurality of semiconductor switches and a plurality of arresters in parallel to the semiconductor switches. The exemplary method includes switching off the semiconductor switching assembly to reduce current in the circuit breaker to a residual current, and switching off the residual current by means of the mechanical switch. The arresters have an added threshold voltage exceeding the nominal voltage. The mechanical switch is arranged in a resonant circuit configured to generate an oscillating current through an arc in the mechanical switch after switching off the semiconductor switching assembly and opening the mechanical switch. The oscillating current has an amplitude exceeding the residual current such that at least one current zero crossing can be generated in the arc of the mechanical switch. The method also includes extinguishing the arc during the current zero crossing.

An exemplary embodiment of the present disclosure provides a method for switching off a high-voltage DC current from a voltage source delivering a nominal voltage by means of a circuit breaker, which includes a semiconductor switching assembly and at least one mechanical switch in series. The semiconductor switching assembly includes a plurality of semiconductor switches and a plurality of arresters in parallel to the semiconductor switches. The exemplary method includes switching off the semiconductor switching assembly to reduce current in the circuit breaker to a residual current, and switching off the residual current by means of the mechanical switch. The arresters have an added threshold voltage exceeding the nominal voltage. The residual current is below 20 Ampere.

An exemplary embodiment of the present disclosure provides a circuit breaker for switching off high-voltage DC currents of a nominal voltage. The exemplary circuit breaker includes a semiconductor switching assembly including a plurality of semiconductor switches and a plurality of arresters in parallel to the semiconductor switches. The arresters have an added threshold voltage exceeding the nominal voltage. The exemplary circuit breaker also includes a mechanical switch arranged in series with the semiconductor switching assembly. In addition, the exemplary circuit breaker includes a resonant circuit including a capacitor and an arc gap of the mechanical switch, where the capacitor is arranged in parallel to the mechanical switch. The circuit breaker is configured to switch off the semiconductor switching assembly to reduce current in the circuit breaker to a residual current, and switch off the residual current by opening the mechanical switch. The mechanical switch is arranged in the resonant circuit which is configured to generate an oscillating current through an arc in the mechanical switch after the semiconductor switching assembly is switched off and the mechanical switch is opened. The oscillating current has an amplitude exceeding the residual current such that at least one current zero crossing can be generated in the arc of the mechanical switch. The arc is extinguished during the current zero crossing.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
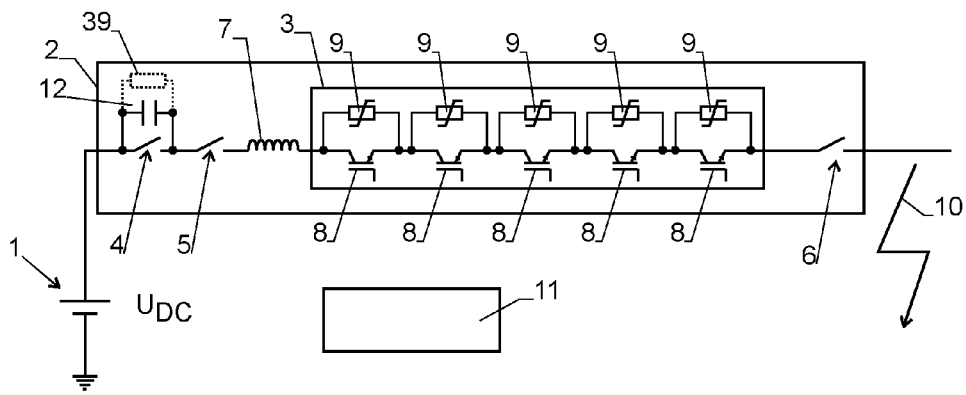
FIG. 1 is a simplified diagram of a high voltage DC system with a circuit breaker according to an exemplary embodiment of the present disclosure.

Exemplary embodiments of the present disclosure provide a method and circuit breaker that allow for a high-voltage DC current to be completely switched off.

Exemplary embodiments of the present disclosure provide a method for switching off a high-voltage DC current from a voltage source delivering a nominal voltage by means of a circuit breaker, which includes a semiconductor switching assembly and at least one mechanical switch in series. The semiconductor switching assembly includes a plurality of semiconductor switches and a plurality of arresters in parallel to the semiconductor switches. Exemplary embodiments of the present disclosure also provide such a circuit breaker.

Accordingly, the circuit breaker used for interrupting a high-voltage DC current having a nominal voltage $U_{DC}$, for example, a nominal DC voltage $U_{DC}$, includes a semiconductor switching assembly and at least one mechanical switch in series. The semiconductor switching assembly includes a plurality of semiconductor switches arranged in parallel to a plurality of arresters. The arresters have an added threshold voltage exceeding the nominal voltage $U_{DC}$. The circuit breaker is operated by first switching off the semiconductor switching assembly and then the mechanical switch. Once all semiconductor switches are off, the residual current flowing through the arresters is comparatively small since the added threshold voltage of the arresters exceeds the nominal voltage $U_{DC}$. The residual current is therefore at such a level that it can be switched off using the mechanical switch.

In accordance with an exemplary embodiment, the circuit breaker includes a resonant circuit, where the mechanical switch is arranged in the resonant circuit. The resonant circuit is structured and designed to generate an oscillating current through the arc in the mechanical switch after switching off the semiconductor switching assembly. The amplitude of the oscillating current rises and exceeds the residual current, thereby generating at least one current zero crossing in the arc. The arc can be extinguished easily during the zero-current crossing.

Current oscillations of this type can be produced by providing the circuit breaker with a resonant circuit that includes a capacitor and the arc gap of the mechanical switch, with the capacitor being arranged in parallel to the mechanical switch. The oscillating circuit further includes an inductance, which can be the inherent inductance of the lines connecting the capacitor and the mechanical switch, or it can be a discrete inductor arranged in the resonant circuit for that purpose. In accordance with an exemplary embodiment, the resonant circuit may be dimensioned to induce current oscillations in the arc that exceed the residual current, i.e. the residual current through the semiconductor switching assembly in its off state while the nominal voltage $U_{DC}$ is applied to the switching assembly.

In accordance with an exemplary embodiment, the mechanical switch is a blast circuit breaker since this type of circuit breaker exhibits a negative arc voltage characteristic i.e. a negative dU/dI-derivative that leads to a build-up of the current oscillations in the resonant circuit. A particularly large negative dU/dI-derivative is observed in puffer circuit breakers.

Exemplary embodiments of the present disclosure also relate to the use of an AC high voltage circuit breaker as a mechanical switch in the method of the present disclosure.

In accordance with another exemplary embodiment, the present disclosure relates to a switching unit for breaking a high-voltage DC current as well as to a method for operating the switching unit.

In this embodiment, the switching unit includes a mechanical switch, a capacitor arranged in parallel to the mechanical switch, and a disconnector in series to the mechanical switch.

In such a switching unit, the mechanical switch with its parallel capacitor can form an oscillating circuit that can generate a current zero crossing in the arc of the switch, while the disconnector can take over the DC load after extinguishing the arc.

According to this exemplary embodiment, the switching unit can be operated for interrupting a high voltage DC current by using the step of opening the mechanical switch, thereby causing current oscillations in an arc of the mechanical switch, which oscillations exceed the current to be switched.

This switching unit can, for example, be used for interrupting the residual current. However, it can also be used elsewhere when a high voltage DC current needs to be interrupted. For example, it can be used to disconnect a circuit under no load condition, when the residual current can be up to some ten Amperes, or to disconnect a discharge resistor, which can be temporarily connected for voltage balancing.

Other features of the exemplary embodiments of the present disclosure are described in more detail below.

The term "high voltage" encompasses voltages of 10 kV or more.

An "arrester" (also called "surge arrester" or "surge diverter") as used herein is a non-linear resistor (varistor) whose resistivity begins to drop substantially for voltages above a threshold voltage (protective voltage level). Such arresters are used as overvoltage protection for the semiconductor switches. Typically but not necessarily, they are based on metal oxide compounds, such as ZnO. An arrester can include a single varistor or a bank of varistors.

The term "added threshold voltage" of a series of arresters refers to the sum of the threshold voltages of the arresters, i.e., to the voltage where the resistance of the series arrangement of the arresters begins to drop substantially.

A "blast circuit breaker" is a mechanical switch whose contacts can be opened to form an arc gap. The arc gap is arranged in a gas, such as $SF_6$ (although other gases might be used as well, such as air), and the circuit breaker is configured to generate, for example by self-blast effect, for example, in a heating chamber, or by compression, for example, in a puffer chamber, a gas flow blowing into the arc formed in the arc gap.

A "puffer circuit breaker" is a blast circuit breaker including a gas volume that is compressed mechanically, for example, in a puffer chamber, by means of suitable drive means while opening the circuit breaker in order to actively generate the gas flow into the arc.

A "high-voltage AC circuit breaker" is a circuit breaker designed to interrupt a major fault current, for example, a ground fault current in high-voltage AC network. Such fault currents are typically in the order of some 10 kA, for example, 60 kA.

A "live tank breaker" (LTB) is a circuit breaker arranged in a housing, which housing is designed to be at live potential, i.e. at the potential $U_{DC}$.

A "dead tank breaker" is a circuit breaker arranged in a housing, which housing is designed to be at ground potential.

A "disconnector" is typically a switch configured to withstand the nominal voltage but is unable to interrupt the nominal current of the system. Disconnectors are typically used for galvanically separating individual sections of a network.

A "discrete inductor" is an inductive device arranged in a line that increases the inductance of the line as compared to the case where there would be no discrete inductor. A discrete inductor is typically a coil.

A "fault current limiter reactor" is a discrete inductor arranged in a high-voltage DC line that is able to withstand a major fault current and designed to limit the current rise rate of the fault current.

"Breaking a high voltage DC current" refers to interrupting any DC current with a "high voltage" recovery voltage. For example, the current that is being interrupted can be a current of a few Amperes or a nominal current of several kA or a fault current. For example, the "switching unit for breaking a high-voltage DC current" described below can for example, only be able to break a few Amperes, while the "circuit breaker for switching off high-voltage DC currents" described below can be able to break a nominal or fault current.

The method and circuit breaker described herein can be used to interrupt a major fault current, for example, a ground fault current, in a high voltage DC network, as well as to switch off other types of currents in such networks. The overall design of such a system with the components relevant in the present context is shown in FIG. 1. The system includes a high-voltage DC source 1 generating a nominal DC voltage $U_{DC}$. This voltage can be in the order of several 100 kV, for example, 340 kV with a nominal current of several kA, such as 2.6 kA.

The current from source 1 passes a circuit breaker 2. The design of circuit breaker 2 is described in more detail below.

Circuit breaker 2 is a combination of a semiconductor switching assembly 3 and a mechanical switch 4. In the exemplary embodiment of FIG. 1, circuit breaker 2 further includes two disconnectors 5, 6 and a fault current limiter reactor 7. The circuit breaker 2 can be capable of interrupting an electrical DC circuit and, in such a function, can be called DC circuit breaker 2 or DC circuit breaker arrangement 2.

Semiconductor switching assembly 3 includes a plurality of semiconductor switches 8, such as IGBT transistors, for example. Further, semiconductor switching assembly 3 includes a plurality of arresters 9 in parallel to the semiconductor switches 8. In accordance with an exemplary embodiment, at least one arrester 9 is arranged in parallel to each or a suitable sub-group of semiconductor switch or switches 8 in order to protect the semiconductor switch 8 in its off state from exceedingly high voltage values.

Each arrester 9 has a threshold voltage above which its conductivity increases rapidly. The arresters 9 are arranged in series and their added threshold voltages exceed the nominal voltage $U_{DC}$, for example, by a factor in a range from 1.5 to 1.6, or in other words by 50% to 60%. Hence, when the voltage over semiconductor switching assembly 3 is approximately equal to $U_{DC}$, for example, when the semiconductor switches 8 are switched off in the presence of a ground fault as indicated by reference symbol 10, the residual current IR passing through semiconductor switching assembly 3 is comparatively small. In accordance with an exemplary embodiment, the residual current IR is below 20 A, for example, between 1 A and 20 A, and is predominantly due to a residual conductivity of the arresters 9 at that voltage, while a small part of the current is formed by a residual flow through the semiconductor switches 8. The residual current IR is much smaller than the nominal current normally flowing through the network.

The purpose of mechanical switch 4 is to interrupt the residual current IR once that the semiconductor switches 8 have been switched off. The mechanical switch 4 uses passive resonance as described below in order to generate a current zero crossing during which its arc is extinguished. Details of this design are provided in the next section.

The disconnectors 5, 6 are used to disconnect at least the semiconductor switching assembly 3, and optionally even more components of the circuit breaker 2, from live voltage. Further, at least one of them, for example, disconnector 5, is designed to take on the DC voltage after extinguishing the arc, thereby preventing long-term DC voltage stress over semiconductor switching assembly 3.

The disconnectors 5, 6 are designed to be switched in the absence of substantial currents. In the exemplary embodiment of FIG. 1, one disconnector 5 is arranged between mechanical switch 4 and semiconductor switching assembly 3. Alternatively, disconnector 5 can be arranged between voltage source 1 and mechanical switch 4, in which case it can also be used to disconnect mechanical switch 4 from high voltage potential.

Fault current limiter reactor 7 limits the rise of the fault current. In addition, it isolates the sensitive semiconductor switches 8 from voltage peaks, for example, due to restrikes, which are generated during switch-off in mechanical switch 4.

The operation of the individual components of circuit breaker 2 is controlled by a control unit 11.

The inherent problem of the interruption of a direct current is the absence of a natural current zero crossing.

If the nominal voltage $U_{DC}$ and the residual current $I_R$ are not exceedingly high, mechanical switch 4 can be able to switch off the residual current $I_R$ in the absence of a current zero crossing if its arc can, for example, be extinguished by suitable means. Advantageously, though, a passive resonance concept is used for generating a current zero-crossing in the arc of mechanical switch 4.

One concept to generate such a current zero-crossing is to excite a growing current oscillation in the electrical path of mechanical switch 4. This so-called passive resonance concept utilizes the interaction of a gas arc with a parallel, predominantly capacitive impedance.

The concept of the passive resonance is also known from phenomena in AC systems when current chopping occurs. This is especially known from switching small inductive currents, where currents of a few Ampere are chopped. Passive resonance occurs due to a high frequency oscillation, which is caused by the interaction of the arc with an effective capacitance arranged parallel to the mechanical switch, and it can lead to a current zero crossing before the regular zero crossing at the power frequency of the AC system. The maximum amplitude of the chopped current depends on the type of the breaker and the capacitance parallel to the breaker. In literature, the following relationship can be found (R. D. Garzon, "High Voltage Circuit Breakers", Marcel Dekker Inc., 2002):

$$I_0 = \alpha \cdot \text{sqrt}(C_p),$$

with $I_0$ being the approximate value of the chopped current, $C_p$ being the parallel capacitance in Farad, sqrt designating the square root operation, and $\alpha$ being a chopping number in the order of $4.10^4$-$17.10^4$ for $SF_6$ puffer breakers.

It has been found that the passive resonance concept can be utilized for switching off the residual DC current $I_R$, which allows for the use of existing high voltage AC technology for mechanical switch 4. For example, it has been found experimentally that an AC puffer breaker can be successfully used to switch off high voltage DC currents in the order of 10 A.

For this reason, a capacitor C has been arranged parallel to mechanical switch 4, thereby placing mechanical switch 4 in a resonant circuit that generates an oscillating current through its arc while it is used to switch off residual current $I_R$.

Figure 2:
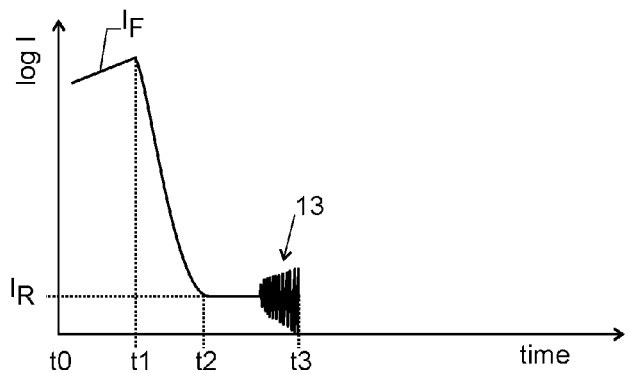
FIG. 2 shows, qualitatively, the decay of the current in the circuit breaker of FIG. 1.

Using this scheme, a switch-off process as illustrated in FIG. 2 can be achieved. FIG. 2 shows a fault current $I_F$ that exists at time t0 at that is rising. At time t1, semiconductor switching assembly 3 is switched to its off state, which leads to a decay of the current to the residual current $I_R$. Now, at time t2, mechanical switch 4 is brought into its off position, which leads to the generation of an arc in its arc gap. As mentioned above, the arc gap with its negative dU/dI characteristics leads to the generation of an oscillating current in a resonant circuit formed by the arc or arc gap, capacitor 12 as well as the inherent inductance of the leads. This oscillating current leads to fast current oscillations 13 in the total current through the arc, which, if their amplitude is sufficient, lead to a current zero crossing at a time t3, at which time the arc can be extinguished.

The frequency of the oscillation depends on the capacitance 4 parallel to the breaker and has been found to be, for example, in the range of 25 kHz to 35 kHz for a capacitance in the order of 1.6 nF to 8 nF for a mechanical switch 4 built from a puffer circuit breaker using $SF_6$ gas. Although the resonance frequency is relatively high, the absolute value of the current time-derivative dI/dt is in the range <5 A/µs, since the current amplitude is relatively low.

Exemplary values of capacitor 12 are between 1 nF and 4 nF. Lower values of capacitor 12 can lead to insufficient oscillations for achieving a current zero crossing and/or to too high values of dI/dt, while higher values lead to unnecessarily high device costs.

Optionally, a resistor 39 (shown with dashed lines) can be placed parallel to capacitor 12. The resistance of this resistor 39 is sufficiently high to have no significant influence on the oscillations described above. Its purpose is to discharge capacitor 12 after a certain time period in order to avoid unnecessary DC voltage stress on the capacitor.

As mentioned, mechanical switch 4 may be a switch with an arc gap arranged in a gas, for example, $SF_6$. In accordance with an exemplary embodiment, mechanical switch 4 is a puffer circuit breaker where the arc is heavily cooled by a gas flow generated at, for example, 5 bar to 15 bar.

Switch-off times for the residual current $I_R$ in a range of 30 ms to 40 ms can be reached by means of a puffer breaker. This compares favorably to the case where the residual current would be switched off by a slow air-insulated disconnector, where more energy would be deposited in the arresters. Also, puffer breakers are more compact than air-insulated disconnectors.

Puffer circuit breakers are presently used in AC systems as an AC high voltage circuit breaker, where they rely on the inherent AC current zero crossing for extinguishing the arc. By using the passive resonant oscillations described in the previous section and thereby generating an artificial current zero crossing also in a DC system, the same type of device can be used here.

The absolute value of the current time-derivative dI/dt during the oscillations is, as mentioned above, in the range <5 A/µs, i.e. in the range below 5 A/µs, which is below typical stresses in AC applications.

The recovery voltage across the mechanical switch 4 after successful interruption of the arc depends also on the capacitance 4, with dU/dt approximately given by $I_R/C_p$, which is in the range of 5 kV/µs for $I_R$=10 Ampere and $C_p$=2 nF. This is lower than typical values experienced in high voltage AC systems.

Hence, in accordance with an exemplary embodiment, an AC high voltage circuit breaker is used as a mechanical switch 4, which allows to greatly reduce development and manufacturing costs since well-known, established technologies can be employed.

Figure 3:
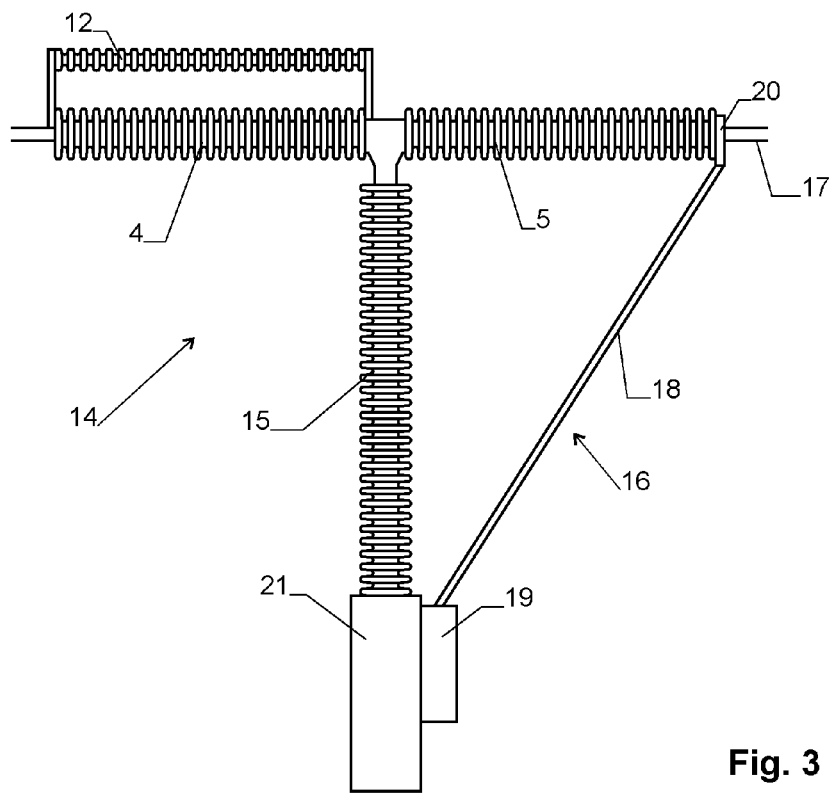
FIG. 3 shows a switching unit with a mechanical switch, a disconnector and an earthing device according to an exemplary embodiment of the present disclosure.
Figure 4:
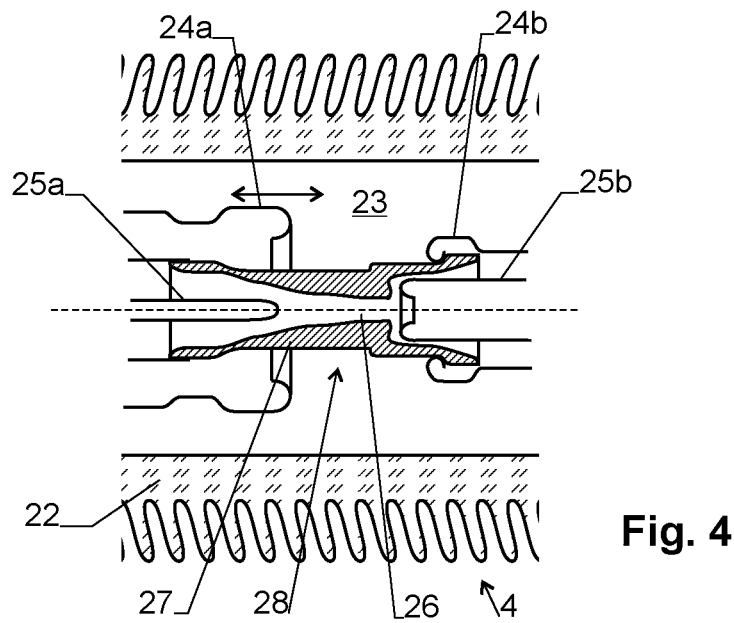
FIG. 4 shows the contacts of the mechanical switch of the unit of FIG. 3 according to an exemplary embodiment of the present disclosure.

An exemplary embodiment of a mechanical switch 4 is shown in FIGS. 3 and 4. In this embodiment, mechanical switch 4 is a live tank breaker and is part of a switching unit 14. Switching unit 14 further includes disconnector 5 arranged in series with mechanical switch 4 as well as an insulating support 15, with disconnector 5 and mechanical switch 4 both mounted to support 15.

It must be noted that, even though an advantageous application of the switching unit 14 is within the system shown in FIG. 1, switching unit 14 can also be used in other applications where a high-voltage DC current has to be interrupted.

Switching unit 14 of FIG. 3 further includes an earthing device 16 for connecting an output line 17 of switching unit 14 to ground after the line has been disconnected from live voltage. Earthing device 16 includes an earthing rod 18 operated by a drive 19 in order to move an earthing hook 20 in and out of engagement with output line 17.

In accordance with an exemplary embodiment, switching unit 14 includes a common driving mechanism 21 for operating mechanical switch 4 as well as disconnector 5. Even if both of them open at the same time, the residual current $I_R$ will be interrupted by mechanical switch 4 because only mechanical switch 4 has a capacitor 12 arranged parallel to it. Capacitor 12 can, for example, be at least one grading capacitor—grading capacitors are typically used for capacitive voltage dividers in AC technology.

The designs of disconnector 5 and mechanical switch 4 can be substantially identical, which further simplifies device design and reduces costs. However, disconnector 5 should be optimized for a good galvanic insulation, while mechanical switch 4 should be optimized to extinguish the arc of the residual current quickly and reliably. This optimization of the two devices can be achieved by small design variations, which will be better understood when viewing FIGS. 4 and 5.

FIG. 4 shows the design of the contacts of mechanical switch 4. As shown in FIG. 4, mechanical switch 4 includes an insulating housing 22 surrounding a gas-filled chamber 23. In accordance with an exemplary embodiment, but not necessarily, mechanical switch 4 includes two pairs of contacts. A first contact pair is formed by the nominal current contacts 24a, 24b, while a second contact pair is formed by the arc contacts 25a, 25b.

Driving mechanism 21 is exemplarily designed and structured to move one contact of each contact pair in an axial direction with respect to the other contact of each contact pair. In the exemplary embodiment of FIG. 4, the contacts 24a and 25b are moved as indicated by a double-arrow in FIG. 4. When opening the switch, driving mechanism 21 first opens the nominal contacts 24a, 24b and only then the arc contacts 25a, 25b, which allows optimization of the design of the nominal contacts for carrying the high nominal current, while the arc contacts can be optimized to carry and extinguish the arc. This design of nominal contacts in combination with arc contacts is known from AC circuit breakers.

The gap (arc gap) 28 between the opened arc contacts 25a, 25b forms in an arc volume 26, which is enclosed by a hollow gas nozzle 27 that bridges the arc gap 28 even when mechanical switch 4 is in its opened state. The purpose of gas nozzle 27 is to guide the gas to the arc for efficiently extinguishing the arc.

In accordance with exemplary embodiments, disconnector 5 serves to galvanically separate individual sections of the network; and/or disconnector 5 need not function as a circuit breaker; and/or disconnector 5 need not function as a load-break switch; and/or disconnector 5 is unable to interrupt the nominal current, for example nominal dc current, of the system; and/or disconnector 5 is unable to interrupt a residual dc current $I_R$ of the system through the semiconductor switching assembly 3. However, the disconnector 5 can have any appropriate design or structure, it being known or different from known techniques, for example, the new and simplified design as disclosed herein and, for example, as disclosed in the context of FIG. 5.

Figure 5:
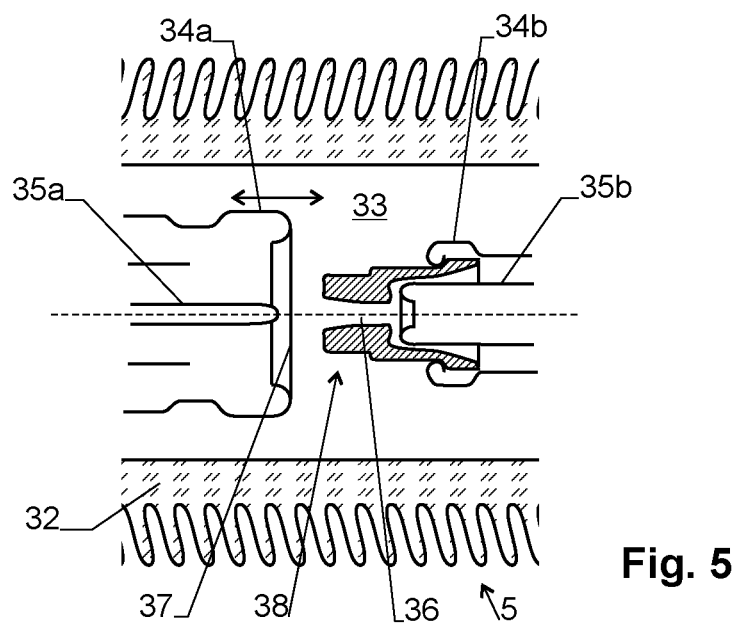
FIG. 5 shows the contacts of the disconnector of the unit of FIG. 3 according to an exemplary embodiment of the present disclosure.

FIG. 5 shows the design of the contacts of disconnector 5 according to an exemplary embodiment. As shown in FIG. 5, the disconnector 5 includes an insulating housing 32, a gas filled chamber 33, nominal current contacts 34a, 34b, arc contacts 35a, 35b, and an arc volume 36 in an arc gap 38. However, gas nozzle 37 of disconnector 5 is shorter than gas nozzle 27 of mechanical switch 4 and therefore does not bridge arc gap 38 when disconnector 5 is in its opened state as shown in FIG. 5.

Alternatively, gas nozzle 37 can be completely absent, even though a residual gas nozzle 37 is advantageous in order to have a similar field distribution in both mechanical switch 4 and disconnector 5, which allows to minimize design differences.

One reason to design disconnector 5 such that it does not have a gas nozzle bridging its arc gap 38 when the disconnector 5 is in its opened state lies in the minimization of creep currents. In the mechanical switch of FIG. 4, small currents can creep along gas nozzle 27. In the design of FIG. 5, no such currents can occur.

As can be seen from FIG. 3, capacitor 12 is arranged parallel to mechanical switch 4, while there is no capacitor arranged parallel to disconnector 5. Hence, the capacitance over mechanical switch 4 is higher than the (inherent) capacitance over disconnector 5. Hence, when opening mechanical switch 4 and disconnector 5, the arc in mechanical switch 4 is extinguished due to the oscillations described above. No such oscillations occur in disconnector 5. However, as soon as the arc in mechanical switch 4 is extinguished, the current through both switches 4, 5 substantially ceases to flow and the arc in disconnector 5 is extinguished as well.

In FIG. 1, fault 10 is illustrated to occur on the side of switching assembly 3 that is opposite to mechanical switch 4, i.e. switching assembly 3 is located between mechanical switch 4 and fault 10. However, the fault can also occur on the opposite side, for example, such that mechanical switch 4 is located between the fault and switching assembly 3. In general, depending on the location of the voltage source(s) and the fault in the network, the mutual positions of the fault, mechanical switch 4 and switching assembly 3 can vary.

The present design of the circuit breaker 2 or circuit breaker arrangement 2 allows for the interruption of a DC current, even a large fault DC current, using a semiconductor switching assembly having a series of arresters 9 whose added threshold voltage (i.e. the total threshold voltage of all series connected arresters 9) is comparatively low. For example, the added threshold voltage is less than $1.6 \cdot U_{DC}$. This allows for a reduction in the number of semiconductor switches required for a given nominal voltage $U_{DC}$, but leads to a comparatively strong residual current $I_R$ in the order of for example, up to 10 A. This residual current can be safely switched off using mechanical switch 4.

In order to extinguish the arc in mechanical switch 4, current zero crossings are generated by means of passive resonance by a suitable choice of the value of capacitor 12.

In the exemplary embodiment of FIGS. 3 and 5, disconnector 5 is a modified puffer circuit breaker as described. However, it can also be an air-insulated disconnector or any other suitable type of disconnector. Disconnector 6 can also be either a puffer circuit breaker, an air-insulated disconnector or any other suitable type of disconnector.

In the exemplary embodiment of FIG. 3, mechanical switch 4 is shown to be a live tank circuit breaker. However, it can also be a dead tank circuit breaker (whose housing is at ground potential) or any other type of circuit breaker or mechanically operated switch.

In the exemplary embodiments of FIGS. 4 and 5, disconnector 5 and mechanical 4 are of identical design with the exception of their gas nozzles. In more general terms, both may be puffer circuit breakers but only the mechanical switch 4 has a gas nozzle bridging the arc gap in the opened state of the switch.

In the exemplary embodiments described above, disconnector 5 includes a single break (switch). However, disconnector 5 can also include several breaks in series in order to break higher voltages.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

REFERENCE SYMBOLS

1: DC voltage source
2: circuit breaker
3: semiconductor switching assembly
4: mechanical switch
5, 6: disconnectors
7: fault current limiter reactor
8: semiconductor switches
9: arresters
10: ground fault
11: control unit
12: capacitor
13: current oscillations
14: switching unit
15: insulating support
16: earthing device
17: output line
18: earthing rod
19: earthing drive
20: earthing hook
21: driving mechanism
22: insulating housing of mechanical switch 4
23: chamber of mechanical switch 4
24a, 24b: nominal current contacts of switch 4

25a, 25b: arc contacts of switch 4
26: arc volume of switch 4
27: gas nozzle of switch 4
28: arc gap of switch 4
32: insulating housing of mechanical disconnector 5
33: chamber of mechanical disconnector 5
34a, 34b: nominal current contacts of disconnector 5
35a, 35b: arc contacts of disconnector 5
36: arc volume of disconnector 5
37: gas nozzle of disconnector 5
38: arc gap of disconnector 5
39: resistor
$U_{DC}$: nominal voltage, for example nominal DC voltage
$I_F$: fault current
$I_R$: residual current
t0, t1, t2, t3: times.

What is claimed is:

1. A method for switching off a high-voltage DC current from a voltage source delivering a nominal voltage by means of a circuit breaker including a semiconductor switching assembly and at least one mechanical switch in series, wherein the semiconductor switching assembly includes a plurality of semiconductor switches and a plurality of arresters in parallel to the semiconductor switches, the method comprising:
switching off the semiconductor switching assembly to reduce current in the circuit breaker to a residual current; and
switching off the residual current by means of the mechanical switch, wherein:
the arresters have an added threshold voltage exceeding the nominal voltage;
the mechanical switch is arranged in a resonant circuit configured to generate an oscillating current through an arc in the mechanical switch after switching off the semiconductor switching assembly and opening the mechanical switch;
the oscillating current has an amplitude exceeding the residual current such that at least one current zero crossing can be generated in the arc of the mechanical switch; and
the method comprises extinguishing the arc during the current zero crossing.

2. The method of claim 1, wherein the residual current is below 20 Ampere.

3. The method of claim 2, wherein the residual current is between 1 and 20 Ampere.

4. The method of claim 1, wherein the circuit breaker is an AC high voltage circuit breaker.

5. The method of claim 1, wherein the arresters have an added threshold voltage of less than 1.6 times the nominal voltage.

6. A method for switching off a high-voltage DC current from a voltage source delivering a nominal voltage by means of a circuit breaker including a semiconductor switching assembly and at least one mechanical switch in series, wherein the semiconductor switching assembly includes a plurality of semiconductor switches and a plurality of arresters in parallel to the semiconductor switches, the method comprising:
switching off the semiconductor switching assembly to reduce current in the circuit breaker to a residual current; and
switching off the residual current by means of the mechanical switch, wherein:
the arresters have an added threshold voltage exceeding the nominal voltage; and
the residual current is below 20 Ampere.

7. The method of claim 6, wherein:
the mechanical switch is arranged in a resonant circuit configured to generate an oscillating current through an arc in the mechanical switch after switching off the semiconductor switching assembly and opening the mechanical switch,
the oscillating current has an amplitude exceeding the residual current such that the mechanical switch generates at least one current zero crossing in the arc of the individual switch; and
the arc is extinguished during the current zero crossing.

8. The method of claim 6, wherein the arresters have an added threshold voltage of less than 1.6 times the nominal voltage.

9. The method of claim 6, wherein the residual current is between 1 and 20 Ampere.

10. A circuit breaker for switching off high-voltage DC currents of a nominal voltage, the circuit breaker comprising:
a semiconductor switching assembly including a plurality of semiconductor switches and a plurality of arresters in parallel to the semiconductor switches, the arresters having an added threshold voltage exceeding the nominal voltage;
a mechanical switch arranged in series with the semiconductor switching assembly; and
a resonant circuit including a capacitor and an arc gap of the mechanical switch, the capacitor being arranged in parallel to the mechanical switch, wherein:
the circuit breaker is configured to switch off the semiconductor switching assembly to reduce current in the circuit breaker to a residual current, and switch off the residual current by opening the mechanical switch;
the mechanical switch is arranged in the resonant circuit which is configured to generate an oscillating current through an arc in the mechanical switch after the semiconductor switching assembly is switched off and the mechanical switch is opened;
the oscillating current has an amplitude exceeding the residual current such that at least one current zero crossing can be generated in the arc of the mechanical switch; and
the arc is extinguished during the current zero crossing.

11. The circuit breaker of claim 10, wherein the resonant circuit is configured to induce current oscillations in the arc of the mechanical switch that exceed the residual current through the semiconductor switching assembly when the semiconductor switching assembly is in an off state with the nominal voltage applied to the semiconductor switching assembly.

12. The circuit breaker of 10, wherein the capacitor has a capacitance in a range of 1 nF to 4 nF.

13. The circuit breaker of claim 10, wherein the mechanical switch is a blast circuit breaker.

14. The circuit breaker of claim 13, wherein the mechanical switch is a puffer circuit breaker.

15. The circuit breaker of claim 10, wherein the mechanical switch comprises nominal current contacts, arc contacts and a driving mechanism configured to first open the nominal contacts and then the arc contacts.

16. The circuit breaker of claim 10, comprising:
a first disconnector in series with the mechanical switch.

17. The circuit breaker of claim 16, wherein a capacitance over the mechanical switch is higher than a capacitance over the first disconnector.

18. The circuit breaker of claim 17, wherein the first disconnector is configured to galvanically separate individual sections of the network.

19. The circuit breaker of claim 16, wherein the first disconnector is configured to galvanically separate individual sections of the network.

20. The circuit breaker of claim 16, comprising:
a second disconnector,
wherein the first disconnector and the second disconnector are configured to disconnect the semiconductor switching assembly.

21. The circuit breaker of claim 16, wherein:
the mechanical switch and the first disconnector are both blast circuit breakers; and
the mechanical switch includes a gas nozzle bridging an arc gap of the mechanical switch when the mechanical switch is in an opened state.

22. The circuit breaker of claim 21, wherein the first disconnector does not include a gas nozzle bridging an arc gap of the first disconnector when the first disconnector is in an opened state.

23. The circuit breaker of claim 21, wherein the first disconnector also includes a gas nozzle, the gas nozzle of the first disconnector being shorter than the gas nozzle of the mechanical switch.

24. The circuit breaker of claim 21, wherein the mechanical switch and the first disconnector are both puffer circuit breakers.

25. The circuit breaker of claim 21, wherein the mechanical switch and the first disconnector are of identical design with the exception of the gas nozzle.

26. The circuit breaker of claim 16, wherein the mechanical switch and the first disconnector include a common driving mechanism.

27. The circuit breaker of claim 16, wherein the first disconnector and the mechanical switch are part of a common switching unit including an insulating support, the first disconnector and the mechanical switch both being mounted to the insulating support.

28. The circuit breaker of claim 27, wherein the switching unit further includes an earthing device.

29. The circuit breaker of claim 10, comprising:
a fault current limiter reactor in series with the switching assembly and the mechanical switch.

30. The circuit breaker of claim 10, wherein the mechanical switch is an AC high voltage circuit breaker.

* * * * *

UNITED STATES PATENT AND TRADEMARK OFFICE
CERTIFICATE OF CORRECTION

PATENT NO. : 9,450,394 B2
APPLICATION NO. : 13/925533
DATED : September 20, 2016
INVENTOR(S) : Daniel Ohlsson et al.

Page 1 of 1

It is certified that error appears in the above-identified patent and that said Letters Patent is hereby corrected as shown below:

In the Claims

Column 12, In Claim 12, line 1 insert the word --claim-- after the word "of".

Signed and Sealed this
Twentieth Day of December, 2016

Michelle K. Lee
*Director of the United States Patent and Trademark Office*